United States Patent Office 3,410,826
Patented Nov. 12, 1968

3,410,826
PROCESS FOR PREPARING SHAPED ARTICLES FROM POLYAMIDE ACIDS BEFORE CONVERTING TO INSOLUBLE POLYIMIDES
Andrew L. Endrey, Parma, Ohio, assignor to E. I. du Pont de Nemours and Company, Wilmington, Del., a corporation of Delaware
No Drawing. Continuation of application Ser. No. 331,354, Dec. 18, 1963. This application Apr. 10, 1967, Ser. No. 629,816
13 Claims. (Cl. 260—47)

This invention relates to a continuous process for preparing aromatic polyimides.

This application is a continuation of our co-pending application U.S. patent application Ser. No. 331,354, filed Dec. 18, 1963, and now abandoned.

By aromatic polyimides are meant those having the formula:

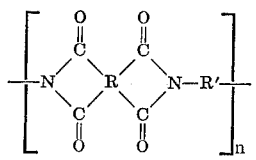

wherein both R and R' are aromatic and $n$ is an integer sufficiently high to provide a self-supporting film, usually sufficient to provide an inherent viscosity of at least 0.3 as measured at 20° C. using a 0.5% solution in a solvent for the polyimide.

In any continuous process that involves several steps, the economics of the process will depend to a substantial extent upon the speed of the process. In turn, the speed of the process will depend upon the speed or lack of speed of the slowest step in the continuous process.

In patent applications Ser. Nos. 169,106 and 169,108, now U.S. Patents No. 3,179,630 and No. 3,179,632, respectively, assigned to the assignee of the present application are disclosed processes for preparing polyimides which processes are made up of several distinct steps. These steps involve: first, the reaction of certain diamines and dianhydrides under conditions that yield a polyamide-acid composition; second, the formation of the polyamide-acid composition into a shaped article; and, finally, the treatment of the shaped article with a dehydrating agent such as a monobasic acid anhydride to convert polyamide-acid in the article to polyimide. Such a process is quite slow and sometimes, not completely successful. The final step of the process requires much time and, when the shaped article has an substantial thickness, the process is not completely effective in converting polyamide-acid to polyimide uniformly.

The object of the present invention is to provide a process that overcomes the above-mentioned shortcomings and is easily adapted to continuous operation. A further object is to provide a process that is adaptable to the formation of films, filaments and other shaped articles of the chemically inert, thermally stable polyimide. Other objects will appear hereinafter.

The process involves the steps, in sequence, of reacting at least one aromatic diamine having the structural formula:

$$H_2N-R'-NH_2$$

wherein R' is an aromatic radical, with at least one aromatic dianhydride in an organic solvent for at least one of the reactants, the solvent being inert to the reactants, for a time and at a temperature sufficient to form a solution in the solvent of a polyamide-acid of the formula:

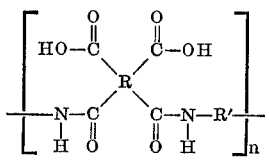

wherein both R and R' are aromatic and $n$ is an integer sufficient to provide a self-supporting film; adding to the polyamide-acid solution a dehydrating agent capable of converting the polyamide-acid in the solution to the corresponding polyimide at a temperature of $T_1$ but maintaining the temperature of the solution below $T_1$ to prevent any substantial conversion to the polyimide; forming the solution into a shaped article; and, thereafter, raising the temperature of the article to at least $T_1$ to convert the polyamide-acid in the article to polyimide.

The starting materials for forming the polyamide-acids are aromatic diamines and aromatic tetracarboxylic acid dianhydrides. The organic diamines are characterized by the formula: $H_2N-R'-NH_2$, wherein R' is a divalent aromatic radical, preferably selected from the following groups: phenylene, naphthylene, biphenylene, anthrylene, furylene, benzfurylene and

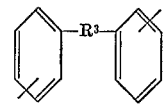

wherein $R^3$ is selected from the group consisting of an alkylene chain having 1–4 carbon atoms, —O—, —S—, —SO$_2$—,

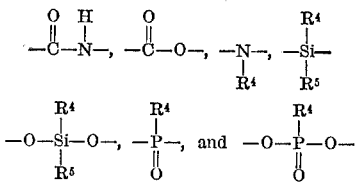

wherein $R^4$ and $R^5$ are alkyl or aryl. Among the diamines which are suitable for use in the present invention are:

metaphenylene diamine;
para-phenylene diamine;
4,4'-diamino-diphenyl propane;
4,4'-diamino-diphenyl methane;
benzidine;
4,4'-diamino-diphenyl sulfide;
4,4'-diamino-diphenyl sulfone;
3,3'-diamino-diphenyl sulfone;
4,4'-diamino-diphenyl ether;
2,6-diamino-pyridine;
is-(4-amino-phenyl) diethyl silane;
bis-(4-amino-phenyl) diphenyl silane;
3,3'-dichloro-benzidine;
bis-(4-amino-phenyl) ethyl phosphine oxide;
bis-(4-amino-phenyl) phenyl phosphine oxide;
bis-(4-amino-phenyl)-N-phenylamine;
bis-(4-amino-phenyl)-N-methyl-amine;
1,5-diamino-naphthalene;
3,3'-dimethyl-4,4'-diamino-biphenyl;
3,3'-dimethoxy benzidine; and mixtures thereof.

The aromatic tetracarboxylic acid dianyhydrides are characterized by the following formula:

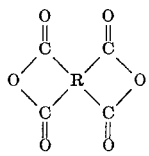

wherein R is a tetravalent aromatic radical, i.e. R is

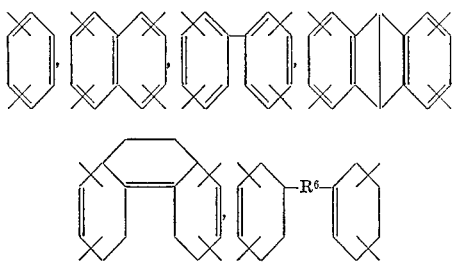

wherein R⁶ is selected from the group consisting of R³ and

The preferred aromatic dianhydrides are those in which the 4 carbonyl groups of the dianhydride are each attached directly to separate carbon atoms in a ring of the dianhydride and wherein the carbon atoms of each pair of carbonyl groups is directly attached to adjacent carbon atoms in the R group to provide a 5-membered ring as follows:

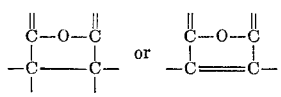

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl) propane dianhydride;
bis(3,4-dicarboxyphenyl) sulfone dianhydride;
3,4,9,10-perylene tetracarboxylic dianhydride;
bis(3,4-dicarboxyphenyl) ether dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloro-naphthalene-1,4,5,8-tetracarboxylic dianhydride;
phenanthrene-1,8,9,10-tetracarboxylic dianhydride;
2,2-bis(2,3-dicarboxyphenyl) propane dianhydride;
1,1-bis(2,3-dicarboxyphenyl) ethane dianhydride;
1,1-bis(3,4-dicarboxyphenyl) ethane dianhydride;
is(2,3-dicarboxyphenyl) methane dianhydride;
bis(3,4-dicarboxyphenyl) methane dianhydride;
is(3,4-dicarboxyphenyl) sulfone dianhydride;
benzene-1,2,3,4-tetracarboxylic dianhydride;
3,4,3',4'-benzophenone tetracarboxylic dianhydride; etc.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent must be a solvent for at least one of the reactants, preferably for both of the reactants. To state it another way, the organic solvent is an organic liquid other than either reactant or homologs of the reactants that is a solvent for at least one reactant, and contains functional groups, the functional groups being groups other than monofunctional primary and secondary amino groups and other than the monofunctional dicarboxyl-anhydro groups. The normally liquid organic solvents of the N,N-dialkylcarboxylamide class are useful as solvents in the process. The preferred solvents are the lower molecular weight members of this class, particularly N,N-dimethylformamide and N,N - dimethylacetamide. They may easily be removed from the polyamide-acid and/or polyamide-acid shaped articles by evaporation, displacement or diffusion. Other typical compounds of this useful class of solvents are: N,N - diethylformamide, N,N - diethylacetamide, N,N - dimethylmethoxy acetamide, N-methyl caprolactam, etc. Other solvents which may be used are: dimethylsulfoxide, N - methyl - 2 - pyrrolidone, tetramethyl urea, pyridine, dimethylsulfone, hexamethylphosphoramide, tetramethylene sulfone, formamide, N - methyl - formamide and butyrolactone. The solvents can be used alone, in combinations of solvents, or in combination with poor solvents such as benzene, benzonitrile, dioxane, xylene, toluene and cyclohexane.

It should be understood that it is not necessary that the polymeric component of the composition to be formed into a shaped article be composed entirely of the polyamide-acid. This is particularly true since conversion to the polyimide is contemplated subsequently. For purposes of this invention, it has been found that in most instances the polymeric component of the composition should contain at least 50% of the polyamide-acid; and, in a few instances, less than 50% of the polyamide-acid in the polymeric component will operate.

Furthermore, in determining a specific time and a specific temperature for forming the polyamide-acid of a specified diamine and a specified dianyhdride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide shapeable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 100° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anyhdride or aniline may be used to "cap" the ends of the polymer chains.

In the preparation of the polyamide-acid, it is essential that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

Inherent viscosity =

$$\frac{\text{natural logarithm } \frac{\text{Viscosity of solution}}{\text{Viscosity of solvent}}}{C}$$

where C is the concentration expressed in grams of polymer per 100 mililiters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

The next step involves adding the dehydrating or cyclizing agent to the solution containing polyamide-acid while maintaining the solution under conditions that prevent any substantial conversion of the polyamide-acid to polyimide. The most important operable dehydrating agents are the lower fatty monobasic acid anhydrides of U.S. patent application Ser. No. 169,106, now U.S. Patent No. 3,179,630 and the aromatic monobasic acid anhydrides of U.S. patent application Ser. No. 169,108, now U.S. Patent No. 3,179,632. However, the list includes lower fatty monobasic acid anhydrides such as acetic anhydride, propionic anhydride, butyric anhydride, valeric anhydride, formic-acetic mixed anhydride, ketene, dimethyl ketene; aromatic monobasic acid anhydrides such as benzoic anhydride, ortho- meta- and para-toluic anhydride, meta- and para-ethyl benzoic anhydride; para-propyl benzoic anhydride; para-isopropyl benzoic anhydride; anisic anhydride; ortho- meta- and para-nitro benzoic anhydride; ortho-, meta and para-halo benzoic anhydride; the various dibromo and dichloro benzoic anhydrides; the tribromo and trichloro benzoic anhydrides; hemellitic anhydride, 3,4-xylic anhydride, isoxylic anhydride, mesitylenic anhydride, veratric anhydride, trimethoxy benzoic anhydride, alpha- and beta-naphthoic anhydrides; biphenylcarboxylic (i.e., para-phenyl benzoic) anhydride; N,N'-disubstituted carbodiimides, lower fatty acid halides, halogenated lower fatty acid halides, halogenated lower fatty acid anhydrides, aryl phosphonic dihalides, thionyl halides, polyphosphoric acid, phosphorus pentoxide, and aryl isocyanates.

The foregoing dehydrating agents are all soluble in organic solvents. These dehydrating agents are also characterized by the fact that they are insufficiently acidic to hydrolyze or otherwise decompose the polymer product. It should be understood that some of these dehydrating agents are less reactive than others. Some are not readily soluble in all the organic solvents but are soluble to a degree sufficient to convert the polyamide-acid to polyimide upon slight heating. Some of the dehydrating agents such as the carbodiimides, phosphonic halides, phosphoric acid and phosphorus pentoxide will require the addition of a washing or neutralizing step following the subsequent conversion step to remove excess reagent and by-products that may form. Several of these dehydrating agents will produce a substantial proportion of polyisoimide upon conversion of the polyamide-acid. However, polyisoimide changes readily to the normal polyimide upon heating to a temperature of at least 300° C.

Although the stoichiometric equivalent, based on the polyamide-acid, of the dehydrating agent alone is operable in the present invention, it is preferred to use 1.5–3 times the stoichiometric amount of the dehydrating agent and to have some of a tertiary amine, preferably pyridine, 3-methyl pyridine or isoquinoline, present as well. The ratio of the tertiary amine to anhydride may vary from zero to almost infinite mixtures with a 0.05–1:1 ratio being the most common range used with teritiary amines having the activity of pyridine and isoquinoline.

Tertiary amines having approximately the same activity as the preferred pyridine, 3-methyl pyridine and isoquinoline may be used in the process. These include 3,4-lutidine, 3,5-lutidine, 4-methyl pyridine, 4-isopropyl pyridine, N,N-dimethyl benzyl amine, 4-benzyl pyridine, and N,N'-dimethyl dodecyl amine. As mentioned previously, these amines are generally used from 0.05 to equimolar amounts with that of the anhydride converting agent. Trimethyl amine and triethylene diamine are much more reactive, and therefore are generally used in still smaller amounts. On the other hand, the following operable amines are less reactive than pyridine: 2-ethyl pyridine, 2-methyl pyridine, triethyl amine, N-ethyl morpholine, N-methyl morpholine, diethyl cyclohexylamine, N,N'-dimethyl cyclohexylamine, 4-benzoyl pyridine, 2,4-lutidine, 2,6-lutidine and 2,4,6-collidine, and are generally used in larger amounts.

During this step in which the dehydrating agent is added, it is necessary to maintain the temperature below that which would cause conversion of the polyamide-acid to polyimide. The particular temperature maintained during this step will depend upon the solvent used, the reactivity of the particular dehydrating agent used and the concentrations of the dehydrating agent and the tertiary amine. Generally, the polyamide-acid solution containing the dehydrating agent is maintained at a temperature of about −5° C. to 15° C. and, in some cases up to room temperature. It has been found that as long as the temperature is maintained below 15° C. or thereabouts the system remains "essentially inactive." By "essentially inactive" it is meant that no more than 10% of polyamide-acid is converted to polyimide in ten minutes at this temperature. It should be understood that occasionally more conversion can be tolerated. The particular amount will depend upon the particular polymer being used, the nature and the amount of solvent and the method contemplated for shaping the polymeric composition into a useful article.

Shaping can be performed in a wide variety of procedures. The polyamide-acid solution can be extruded, spun, sprayed, blade-coated or molded. Films of the solution can be conveniently formed by extruding the solution through an orifice onto a belt, drum or similar smooth surface. Fibers can be made by "dry" spinning. Foams can be made by the techniques disclosed in U.S. patent application Ser. Nos. 266,066 and 266,065, the latter now U.S. Patent. No. 3,249,561. The polyamide-acid solution may also be sprayed onto a surface to provide a coating. Spraying is particularly useful for coating irregularly shaped articles and rough surfaces and for impregnating porous materials. Fillers or other additives (pigments, abrasives, etc.) can be added at any time prior to shaping.

In the next step, the temperature of the shaped article is raised in order to convert the polyamide-acid in the article to polyimide. The temperature at which the system can be thus activated depends primarily upon the activity and the amount of the dehydrating agent present. Usually, the temperature is elevated to one in the range of 40–175° C. Ketene can be activated at temperatures as low as 10° C. The use of such temperatures will convert the polymer to polyimide within 10 to 100 seconds. The utility of the described process lies in the unique rapidity and economy that it affords in the fabrication of shaped polyimide products such as films and fibers. This derives from the high degree of control over the imidization reaction achieved in the process. Surprisingly, a substantial period between the addition of the dehydration agent and gelation can be achieved so that mixing, transporting and forming can be easily accomplished without sacrificing rapid conversion to the desired highly imidized gel. This gelation stabilizes the shape of the fabricated object and prevents distortion by flow. It has also been found that the gel does not recoalesce easily so gel films and fibers can be wound up and stored prior to final conversion to polyimide.

In order to specify the details of a continuous film-producing process, it is first necessary to know the gelation time for a particular polyamide-acid solution under a particular set of conditions. The following method for determining gelation time is suggested:

Weigh out sufficient polyamide-acid solution to provide 0.01 mole (based on repeat unit weight) of polymer solids. Contamination and atmospheric moisture should be avoided. Next, add 0.04 mole of acetic anhydride. Mix thoroughly and adjust to the desired gelation temperature. Finally, add 0.005 mole of the tertiary amine catalyst (pyridine or the like) and mix thoroughly. The period between the addition of catalyst and the observation of a sudden increase in viscosity is the "gelation time."

Other advantages stem from the fact that the converting agent, the dehydrating agent, is distributed homogeneously through the polyamide-acid solution. Hence, after the shaped article has been formed, there is no necessity for diffusing the converting agent through the polyamide-acid article. This results in a saving of time, a saving of solvent and a more homogeneous product.

The invention will be more clearly understood by referring to the examples which follow. These examples, which illustrate specific embodiments of the present invention, should not be construed to limit the invention in any way.

The preparations of some of the important ingredients used in the examples are given below:

The pyromellitic dianhydride used was obtained as white crystals by sublimation of the commercial product through silica gel at 220–240° C. and 0.25–1 mm. mercury pressure.

N,N-dimethylacetamide was prepared by fractional distillation from phosphorous pentoxide; the fraction distilling at 73° C. and 30 mm. pressure being N,N-dimethylacetamide.

Example 1

Four grams (0.0199 mole) of 4,4′-diamino diphenyl ether and 4.34 grams (0.0199 mole) of pyromellitic dianhydride are placed in a 250 milliliter flask equipped with mechanical stirrer. 47.2 grams of N,N-dimethylacetamide is added with stirring as the mixture is maintained under a dry nitrogen atmosphere. The reaction is conducted at room temperature (23° C.) and stirring is continued for three hours. N,N-dimethylacetamide is added to the viscous solution to give a 15% by weight polyamide-acid solution.

To 27.9 grams of the 15% N,N-dimethylacetamide solution of the polyamide-acid obtained (4.18 grams or 0.01 mole of polymer) is added 4.08 grams (0.04 mole) of acetic anhydride and 0.64 gram (0.005 mole) of isoquinoline. The mixture is held at room temperature while agitating it for about 3 minutes. The mixture is cast using a doctor knife onto a heated glass plate at 80° C. Gelation of the cast film occurs in less than one minute. The gel film is stripped from the plate and dried under restraint in a frame in an oven at 300° C. for 15 minutes. The resulting polyimide film exhibits good physical properties.

Example 2

Another sample of the Example 1 reaction mixture is pressed in a platten press between sheets of "Teflon"* FEP fluorocarbon film at 100° C. for 1 minute to yield a gel film which dries rapidly when placed on a frame at 300° C. The resulting polyimide film is clear and tough.

It strips readily from the drum at the desired time and dries rapidly under restraint in an oven at 350° C. The resulting polyimide film has the following properties:

Tensile strength (p.s.i.).—23° C., 20,000; 200° C., 12,000.
Modulus (p.s.i.).—23° C., 400,000; 200° C., 200,000.
Hydrolytic stability (boiling water).—Greater than 2 months.
Thermal stability (300° C. in air).—Greater than 2 months.

Example 3

Meta-phenylene diamine, 12.4 grams, is dissolved in 100 mls. of N,N-diethylformamide. Pyromellitic dianhydride, 25.1 grams, is added portionwise with stirring over a period of one hour. The last portion of the dianhydride is added with 25 mls. of N,N-dimethylformamide. The mixture is stirred for an hour and becomes very viscous. The mixture is then diluted with 100 mls. of N,N-dimethylformamide and stirred. Then, 6.6 mls. of acetic anhydride and 7 mls. of N,N-dimethylformamide is added. The mixture is stirred and 10 mls. of pyridine is added. The resulting mixture is further stirred for 30 minutes while being cooled to prevent any substantial conversion of polyamide-acid to polyimide. Films are cast with a 15 mil knife on glass plates. After drying at 120° C. for 15 minutes, conversion to tough polyimide films is completed by heating at 300° C. for 15 minutes.

Examples 4–8

The polymer and the procedure for Example 1 are used with each of the anhydride converting agents and catalysts shown below. In each case the glass plate onto which the film is doctored is at 100° C.

| | Anhydride | Moles/ Mole of Polymer | Catalyst | Moles/ Mole of Polymer | Time of Heating (minutes) |
|---|---|---|---|---|---|
| Example: | | | | | |
| 4 | Acetic | 3 | 3,5-lutidine | 0.5 | 0.5 |
| 5 | do | 3 | 3-methyl pyridine | 0.5 | 0.5 |
| 6 | Propionic | 3 | Isoquinoline | 0.5 | 1 |
| 7 | n-Butyric | 3 | do | 0.5 | 10 |
| 8 | Benzoic | 3 | do | 1 | 10 |

All mixtures remain sufficiently stable at 10° C. so that they can be mixed thoroughly for several minutes before casting. The product in each case is the polypyromellitimide of 4,4′-diaminodiphenyl ether.

Examples 9–13

A 15% solution of the polyamide-acid of pyromellitic dianhydride and 4,4′-diaminodiphenyl ether in diamethylformamide, also containing a 5-fold molecular excess of thionyl chloride and twice the equivalent amount of pyridine, is prepared and kept at 10° C. to prevent premature gelation. The solution is cast onto an 80–100° C. plate, where it gels very rapidly. Subsequent drying at 300° C. is accomplished in only 15 minutes, giving a tough polyimide film.

Likewise, when each of the following dehydrating agents is substituted for thionyl chloride, the reaction mixture behaves substantially the same, including rapid drying to a good polyimide film: phenyl phosphonic dichloride, acetyl chloride, chloroacetyl chloride, and chloroacetic anhydride.

* Du Pont registered trademark.

Examples 14–16

Substitution of each of the following dehydrating agents for thionyl chloride in the procedure for Example 9 produces a good polyimide film. In each of these examples, warming is required to effect the conversion.

| Example: | Dehydrating agent |
|---|---|
| 14 | Polyphosphoric acid. |
| 15 | Phosphorus pentoxide. |
| 16 | Phenyl isocyanate. |

Examples 17–18

When Example 9 is repeated, with dicyclohexylcarbodiimide and with trifluoroacetic anhydride, respectively, instead of thionyl chloride, it is necessary to cool the reaction mixture carefully because conversion to polyimide occurs rapidly at room temperature. The products are polyisoimide, which changes largely to normal polyimide on heating at about 300° C. for several hours.

Examples 19–21

The procedure of Example 1 is repeated, using the polypyromellitamide-acids of the following diamines:

4,4'-diaminodiphenylmethane
4,4'-diaminodiphenyl sulfide
p-phenylenediamine

In each case the gel film is strong, and dries unusually rapidly to a tough polyimide film. Gelation times of the intermediate solutions are satisfactory.

I claim:

1. In a process in which an organic solvent solution of a polyamide-acid having recurring units of the formula:

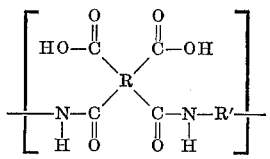

wherein R' is selected from the group consisting of phenylene, naphthylene, biphenylene, anthrylene, furylene, benzfurylene and

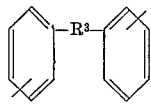

wherein $R^3$ is selected from the group consisting of an alkylene chain having 1 to 4 carbon atoms, —O—, —S—, —SO$_2$—,

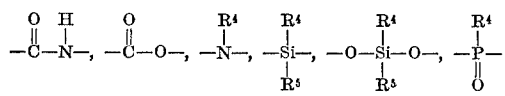

and

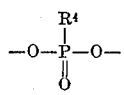

wherein $R^4$ and $R^5$ are selected from the group consisting of alkyl and aryl, and wherein R is a tetravalent radical selected from the group consisting of

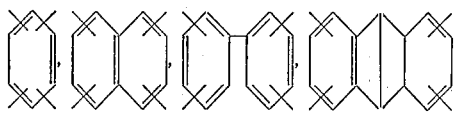

and

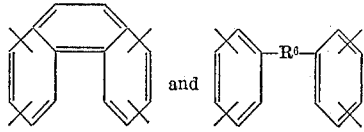

wherein $R_6$ is selected from the group consisting of $R^3$ and

is provided and is formed into a shaped article, and thereafter the temperature of said article is raised and said polyamide-acid in said article is converted to polyimide, the improvement comprising adding to said solution of polyamide-acid at a temperature below 15° C. a dehydrating agent capable of converting the polyamide-acid in the solution to the corresponding polyimide at a temperature above 15° C., maintaining the resulting polyamide-acid solution below 15° C. until it has been shaped to said article, and thereafter heating said article to above 15° C., to convert the polyamide-acid therein to polyimide.

2. The process of claim 1 wherein R' is the amine free nucleus of an aromatic diamine selected from the group consisting of 4,4'-diaminodiphenyl ether, 4,4'-diaminodiphenyl methane, 4,4'-diaminodiphenyl sulfide, metaphenylene diamine and paraphenylene diamine.

3. The process of claim 1 wherein R is the tetravalent aromatic nucleus in pyromellitic dianhydride.

4. The process of claim 1 wherein said dehydrating agent is a lower fatty mono-carboxylic acid anhydride.

5. The process of claim 1 wherein said deyhdrating agent is a carbocyclic aromatic mono-carboxylic acid anhydride.

6. The process of claim 1 wherein said dehydrating agent is a halogenated lower fatty acid anhydride.

7. The process of claim 1 wherein said dehydrating agent is an aryl isocyanate.

8. The process of claim 1 wherein said dehydrating agent is a lower fatty acid halide.

9. The process of claim 1 wherein said dehydrating agent is an aryl phosphonic dihalide.

10. A process in accordance with claim 1 in which the dehydrating agent is selected from the group consisting of thionyl chloride, phenyl phosphonic dichloride, acetyl chloride, chloroacetyl chloride, chloroacetic anhydride, phosphorus pentoxide, phenyl isocyanate, and trifluoroacetic anhydride.

11. In a process for preparing polyimide wherein 4,4'-diamino-diphenyl ether is reacted with pyromellitic dianhydride in an organic solvent for at least one of the reactants, said solvent being inert to the reactants, for a time and at a temperature sufficient to form a solution in the solvent of a polyamide-acid having at least about 50% of recurring units of the fromula:

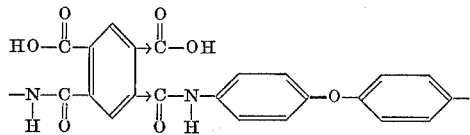

sufficient to provide a self-supporting film; forming said solution into a shaped article; and, thereafter, raising the temperature of said article to convert the polyamide-acid in said article to polyimide having recurring units of the formula:

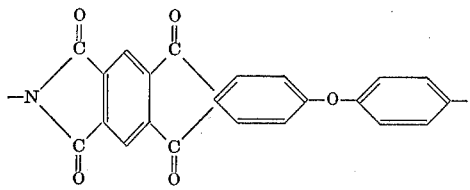

the improvement of adding to said polyamide-acid solution about 1 to 3 stoichiometric equivalents, based on the polyamide-acid, of a lower fatty monocarboxylic acid anhydride and about 0.05 to 1 molar equivalents, based on the lower fatty monocarboxylic acid anhydride, of a tertiary amine while maintaining the temperature of the solution below 15° C. to prevent substantial conversion in said solution to the polyimide.

12. A process as in claim 11 wherein said lower fatty monobasic acid anhydride is acetic anhydride and said tertiary amine is selected from the group consisting of pyridine, 3-methyl pyridine and isoquinoline.

13. The process of claim 11 wherein said shaped article is a self-supporting film.

References Cited

UNITED STATES PATENTS

| | | | |
|---|---|---|---|
| 3,179,630 | 4/1965 | Endrey | 260—78 |
| 3,179,632 | 4/1965 | Hendrix | 260—78 |
| 3,179,633 | 4/1965 | Endrey | 260—78 |
| 3,179,634 | 4/1965 | Edwards | 260—78 |

WILLIAM H. SHORT, *Primary Examiner.*

L. L. LEE, *Assistant Examiner.*

UNITED STATES PATENT OFFICE
CERTIFICATE OF CORRECTION

Patent No. 3,410,826                                          November 12, 1968

Andrew L. Endrey

It is certified that error appears in the above identified patent and that said Letters Patent are hereby corrected as shown below:

Column 10, line 1, "$R_6$" should read -- $R^6$ --. same column 10, lines 63 to 70, the formula should appear as shown below:

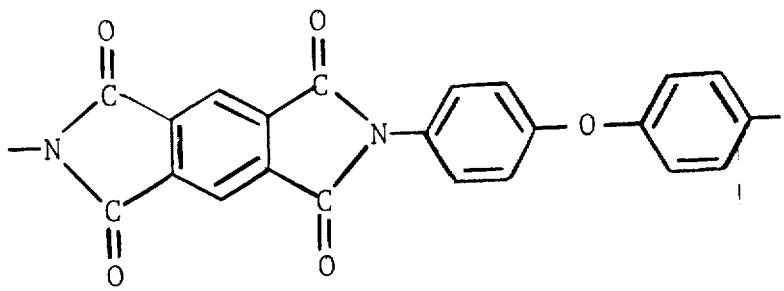

Signed and sealed this 24th day of March 1970.

(SEAL)
Attest:

EDWARD M. FLETCHER, JR.
Attesting Officer

WILLIAM E. SCHUYLER, JR.
Commissioner of Patents